United States Patent
Park et al.

(10) Patent No.: US 9,873,791 B1
(45) Date of Patent: Jan. 23, 2018

(54) LONG CARBON FIBER REINFORCED THERMOPLASTIC RESIN COMPOSITION FOR FOAM INJECTION AND MOLDED ARTICLE MANUFACTURED USING THE SAME

(71) Applicants: Hyundai Motor Company, Seoul (KR); GS Caltex, Seoul (KR)

(72) Inventors: Sang Sun Park, Whasung-Si (KR); Ji Hyun Jung, Whasung-Si (KR); Jong Tae Seo, Whasung-Si (KR); Hyung Tak Lee, Whasung-Si (KR); Woong Jae Boo, Whasung-Si (KR)

(73) Assignees: HYUNDAI MOTOR COMPANY, Seoul (KR); GS CALTEX, Seoul (KR)

( * ) Notice: Subject to any disclaimer, the term of this patent is extended or adjusted under 35 U.S.C. 154(b) by 0 days.

(21) Appl. No.: 15/370,164

(22) Filed: Dec. 6, 2016

(30) Foreign Application Priority Data

Sep. 6, 2016 (KR) .......................... 10-2016-0114473

(51) Int. Cl.
*C08L 77/02* (2006.01)

(52) U.S. Cl.
CPC ........... *C08L 77/02* (2013.01); *C08L 2205/06* (2013.01); *C08L 2207/04* (2013.01)

(58) Field of Classification Search
CPC .......... C08L 77/00; C08L 77/02; C08L 77/04; C08L 77/06; C08L 77/08; C08L 77/10; C08L 77/12; C08L 2207/04; C08L 2205/06; C08L 2205/24; C08L 2205/242; C08L 2203/14
See application file for complete search history.

(56) References Cited

U.S. PATENT DOCUMENTS

| | | | | |
|---|---|---|---|---|
| 5,001,181 A | * | 3/1991 | Takagi | C08L 71/123 524/280 |
| 7,879,933 B2 | * | 2/2011 | Hanssen | C08K 5/0083 524/117 |
| 2002/0123572 A1 | * | 9/2002 | Park | C08L 23/04 525/191 |
| 2004/0235987 A1 | * | 11/2004 | Fischer | C08K 5/098 523/216 |
| 2012/0065327 A1 | * | 3/2012 | Ogawa | C08G 69/26 524/606 |
| 2014/0303311 A1 | * | 10/2014 | Jain | C08L 77/00 524/538 |

FOREIGN PATENT DOCUMENTS

| | | |
|---|---|---|
| JP | 10-130491 (A) | 5/1998 |
| JP | 2011-529986 (A) | 12/2011 |
| JP | 2012-509381 (A) | 4/2012 |
| KR | 10-2002-0022585 A | 3/2002 |
| KR | 10-2007-0028736 (A) | 3/2007 |
| KR | 10-2014-0087913 A | 7/2014 |

OTHER PUBLICATIONS

Polymer Processing with Super Critical Fluids, Dec. 2004, pp. 19,20.*

\* cited by examiner

*Primary Examiner* — Christopher M Rodd
(74) *Attorney, Agent, or Firm* — Morgan, Lewis & Bockius LLP

(57) ABSTRACT

A long carbon fiber reinforced thermoplastic resin composition for foam injection and a molded article manufactured using the same are provided. More particularly, the thermoplastic resin composition and the manufactured molded article may be capable of improving component assembly and stability by minimizing deformation after foam injection molding. Such composition and molded article can be utilized as a component for a vehicle structure such as a panoramic sunroof frame. Also provided herein is a low-density polyamide-6 polymer comprising a long carbon fiber reinforcing agent, a thermoplastic elastomer, a silane-based coupling agent and a sodium phosphate nucleating. The polymer is suitable for foam injection. The thermoplastic resin composition and molded article made of said composition are light weight and economic feasibility as well as having high stiffness, durability, dimensional stability, and a desirable injection appearance.

12 Claims, 1 Drawing Sheet

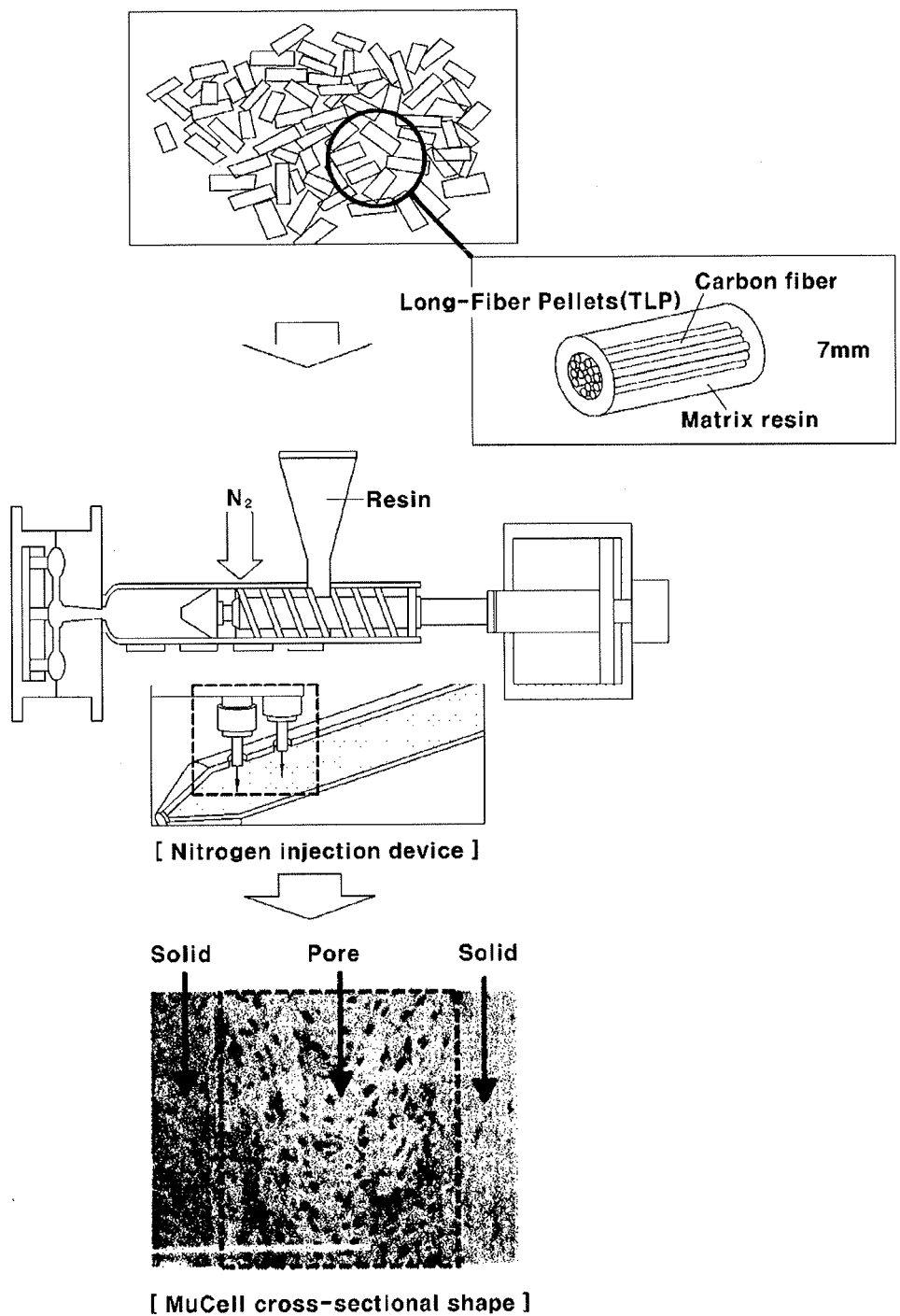

LONG CARBON FIBER REINFORCED THERMOPLASTIC RESIN COMPOSITION FOR FOAM INJECTION AND MOLDED ARTICLE MANUFACTURED USING THE SAME

CROSS-REFERENCE TO RELATED APPLICATION

This application claims under 35 U.S.C. §119(a) the benefit of Korean Patent Application No. 10-2016-0114473, filed on Sep. 6, 2016, the entire contents of which are incorporated herein by reference for all purposes.

BACKGROUND

Technical Field

The present invention relates to a long carbon fiber reinforced thermoplastic resin composition for foam injection and a molded article manufactured using the same. More particularly, it relates to a composition and a molded article manufactured thereof that is useful for improving component assembly and stability by minimizing deformation after foam injection molding. As such, the composition and molded article can be utilized as a component for a vehicle structure such as a panoramic sunroof frame. Provided herein is a long carbon fiber reinforced thermoplastic resin composition comprising a long carbon fiber reinforcing agent, a thermoplastic elastomer, a silane-based coupling agent and a sodium phosphate nucleating agent along with a low-density polyamide-6 polymer. The composition is suitable for foam injection. It is also light weight and economic feasibility, and also provides high stiffness, durability, dimensional stability, and an excellent injection appearance.

Background Art

Current trends in the automotive industry include generating light weight, technical advanced, and environmental-friendly components and vehicles. For instance, the light-weightness of a vehicle is closely associated with fuel efficiency and traveling performance of the vehicle. A panoramic sunroof is manufactured to provide internal ventilation and an open view from within the vehicle. Such sunroofs include glass, an electric motor, and the like which are attached to a frame. The panoramic sunroof frame must withstand the load of peripheral components and the shock from the outside. Typically, a steel frame is used. However, to reduce the weight of the vehicle, engineered plastics have been tested. For example, a material of reinforcing glass fiber in polybutylene terephthalate is at least 30% lighter in weight compared to steel.

However, the polybutylene terephthalate/glass fiber materials can be deformed after injection and cause problems. Further, in order to apply stiffness needed for a panoramic sunroof frame, the density of the material can be increased by increasing the content of the glass fiber. Unfortunately, this results in diminished light-weight properties.

In the related art, Japanese Patent Application publication No. 1998-130491 describes a polyamide resin composition which is frequently used in mechanical, electronic, automotive components and the like. The resin composition has excellent impact resistance, a polishing property, and dimensional stability. Japanese Patent Publication No. 2012-509381 describes a composition with excellent mechanical strength which is used in automotive, construction, and sporting goods. This composition combines polyamide and a reinforcing agent. Japanese Patent Publication No. 2011-529986 describes a high-temperature resin composition of a polyamide base with chemical resistance, processability, and heat resistance which is used in automotive and battery/electronic fields. Korean Patent Application Publication No. 10-2007-0028736 discloses a foam body manufactured by mixing and injecting a polypropylene resin and an inorganic chemical foam agent.

There remains a need for a material for foam injection that has excellent light weightness and economic feasibility. It is also desirable for the material to have an excellent high stiffness, durability, dimensional stability, and injection appearance.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

In the present invention, it is found that a low-density polyamide-6 polymer can be used as a base resin with a long carbon fiber to provide improved stiffness when combined with a reinforcing agent a thermoplastic elastomer, a silane-based coupling agent and a sodium phosphate nucleating agent. When these components are included at a constant composition ratio, the resulting resin composition is light weight and economic feasibility. Also, the resin composition has desirable properties such as dimensional stability, mechanical strength, and durability. The surface appearance of the material during foam injection molding is excellent, and deformation due to molding can be minimized.

Accordingly, the present invention provides a long carbon fiber reinforced thermoplastic resin composition for foam injection that is light weight and economic feasibility, and simultaneously provides dimensional stability, mechanical strength, durability and a desirable injection appearance.

Also provided is a molded article manufactured by molding the long carbon fiber reinforced thermoplastic resin composition via foam injection. The molded article has minimal mold deformation characteristics and exhibits improved component assembly and stability.

In some aspects, the present invention provides a long carbon fiber reinforced thermoplastic resin composition for foam injection comprising:

about 45 wt % to about 90 wt % (e.g., about 45 wt %, 46, 47, 49, 50, 51, 53, 55, 57, 59, 60, 61, 63, 65, 67, 69, 70, 71, 73, 75, 77, 79, 80, 81, 83, 85, 87, 89, or about 90 wt %) of a polyamide-6 polymer;

about 5 wt % to about 40 wt % (e.g., about 5 wt %, 10, 15, 20, 25, 30, 35 or about 40 wt %) of a long carbon fiber reinforcing agent with an average cross-sectional diameter of from about 5 µm to about 15 µm (e.g., about 5 µm, 6, 7, 8, 9, 10, 11, 12, 13, 14, or about 15 µm) and a length of from about 5 mm to 15 mm (e.g., about 5 mm, 6, 7, 8, 9, 10, 11, 12, 13, 14, or about 15 mm);

about 1 wt % to about 10 wt % (e.g., about 1 wt %, 2, 3, 4, 5, 6, 7, 8, 9, or about 10 wt %) of a thermoplastic elastomer with a melt index of from about 10 to 40 g/10 min (e.g., about 10 g/10 min, 12, 14, 16, 18, 20, 22, 24, 26, 28, 30, 32, 34, 36, 38 or about 40 g/10 min) (@230° C., 2.16 kg);

about 1 wt % to about 5 wt % (e.g., about 1 wt %, 2, 3, 4, or about 5 wt %) of a silane-based coupling agent; and about 0.1 wt % to about 2 wt % (e.g., about 0.1 wt %, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or about 2 wt %) of a sodium phosphate nucleating agent.

In another aspect, the present invention provides a molded article manufactured by molding the long carbon fiber reinforced thermoplastic resin composition described herein by way of foam injection.

According to the present invention, the long carbon fiber reinforced thermoplastic resin composition minimizes deformation after foam injection molding. The composition light weight and economic feasibility. For instance, it is low weight and light weight, yet possesses high stiffness, durability and dimensional stability compared to polybutylene terephthalate/glass fiber materials in the related art. Thus, the composition can be used for improving assembly and stability of components. Particularly, the long carbon fiber reinforced thermoplastic resin composition has an excellent injection appearance during foam injection molding.

Therefore, the long carbon fiber reinforced thermoplastic resin composition can be utilized as an exterior component material for a vehicle structure such as a panoramic sunroof frame as a foam injection molded article.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 1 is a schematic diagram illustrating a series of processes of foam injection molding using a resin composition of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the FIGURES, reference numbers refer to the same or equivalent parts of the present invention throughout the several FIGURES of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in more detail as one exemplary embodiment.

A long carbon fiber reinforced thermoplastic resin composition of the present invention includes (A) about 45 wt % to about 90 wt % (e.g., about 45 wt %, 46, 47, 49, 50, 51, 53, 55, 57, 59, 60, 61, 63, 65, 67, 69, 70, 71, 73, 75, 77, 79, 80, 81, 83, 85, 87, 89, or about 90 wt %) of a polyamide-6 polymer obtained by ring-opening polymerization of ε-caprolactam; (B) about 5 wt % to about 40 wt % (e.g., about 5 wt %, 10, 15, 20, 25, 30, 35 or about 40 wt %) of a long carbon fiber reinforcing agent with an average cross-sectional diameter of about 5 μm to about 15 μm (e.g., about 5 μm, 6, 7, 8, 9, 10, 11, 12, 13, 14, or about 15 μm) and a length of from about 5 mm to about 15 mm (e.g., about 5 mm, 6, 7, 8, 9, 10, 11, 12, 13, 14, or about 15 mm); (C) from about 1 wt % to about 10 wt % (e.g., about 1 wt %, 2, 3, 4, 5, 6, 7, 8, 9, or about 10 wt %) of a thermoplastic elastomer with a melt index of from about 10 g/10 min to 40 g/10 min (e.g., about 10 g/10 min, 12, 14, 16, 18, 20, 22, 24, 26, 28, 30, 32, 34, 36, 38 or about 40 g/10 min) (@230° C., 2.16 kg); (D) from about 1 wt % to 5 wt % (e.g., about 1 wt %, 2, 3, 4, or about 5 wt %) of a silane-based coupling agent; and (E) about 0.1 wt % to about 2 wt % (e.g., about 0.1 wt %, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or about 2 wt %) of a sodium phosphate nucleating agent.

According to a preferred embodiment of the present invention, the long carbon fiber reinforced thermoplastic resin composition maximizes light weight and economic feasibility effects due to implementation of low weight and simultaneously minimizes deformation after injection molding due to excellent dimensional stability and excellent property balance such as high stiffness and durability as compared with polybutylene terephthalate/glass fiber materials in the related art, thereby improving assembly and stability of components.

Respective composition components and a composition ratio configuring the long carbon fiber reinforced thermoplastic resin composition of the present invention will be described below in detail.

Polyamide-6 Polymer

According to a preferred embodiment of the present invention, the polyamide-6 polymer is obtained by ring opening polymerization of ε-caprolactam and may be included for applying excellent mechanical strength, impact resistance, heat resistance, and flowability while ensuring light weight to the resin composition of the present invention. In particular, the polyamide-6 polymer may ensure light weight of a molding body with a low-density material with the density of from about 1.12 to about 1.15 and has excellent property characteristics such as dimensional stability, mechanical strength, impact resistance, and heat resistance to minimize deformation after foam injection molding.

According to a preferred embodiment of the present invention, the polyamide-6 polymer may use a polyamide-6 polymer with a number average molecular weight of about 20,000 to about 70,000 (e.g., about 20,000, 25,000, 30,000, 35,000, 40,000, 45,000, 50,000, 55,000, 60,000, 65,000, or about 70,000) and may be used alone or in a combination of two or more polyamide-6 polymers having different molecular weights. In particular, when the number average molecular weight of the polyamide-6 polymer is less than 20,000, mechanical strength and impact resistance may deteriorate, and when the number average molecular weight is greater than 70,000, in a pultrusion impregnation process, the impregnation of the long carbon fiber reinforcing agent deteriorates and the mechanical property deteriorates, and a non-molding problem may be caused by lack of flowability in the injection process.

According to a preferred embodiment of the present invention, the polyamide-6 polymer may be included in a range of about 45 wt % to about 90 wt % (e.g., about 45 wt %, 46, 47, 49, 50, 51, 53, 55, 57, 59, 60, 61, 63, 65, 67, 69, 70, 71, 73, 75, 77, 79, 80, 81, 83, 85, 87, 89, or about 90 wt %) with respect to the entire weight of the resin composition. When the content of the polyamide-6 polymer is smaller than 45 wt %, impact resistance may deteriorate and when the content thereof is larger than 90 wt %, the mechanical strength may deteriorate. More preferably, the polyamide-6 polymer may be included in a range of from about 60 wt % to about 90 wt % (e.g., about 60 wt %, 61, 63, 65, 67, 69, 70, 71, 73, 75, 77, 79, 80, 81, 83, 85, 87, 89, or about 90 wt %) with respect to the entire weight of the resin composition and much more preferably, included in a range of about 60 wt % to about 80 wt % (e.g., about 60 wt %, 61, 62, 63, 64, 65, 66, 67, 68, 69, 70, 71, 72, 73, 74, 75, 76, 77, 78, 79, or about 80 wt %).

Long Carbon Fiber Reinforcing Agent

According to a preferred embodiment of the present invention, the long carbon fiber reinforcing agent may be included for applying a mechanical property, impact resistance, and dimensional stability while ensuring light weight to the resin composition of the present invention. The long carbon fiber reinforcing agent may be a fiber or bundle structure having a cylindrical, oval or polygonal cross section and prepared by using polyacrylonitrile (PAN), pitch or a mixture thereof as a raw material. The long carbon fiber reinforcing agent may use a long carbon fiber reinforcing agent having an average cross-sectional diameter of from about 5 μm to about 15 μm (e.g., about 5 μm, 6, 7, 8, 9, 10, 11, 12, 13, 14, or about 15 μm) and a length of from about 5 mm to about 15 mm (e.g., about 5 mm, 6, 7, 8, 9, 10, 11, 12, 13, 14, or about 15 mm). Particularly, when the average cross-sectional diameter is smaller than 5 μm, the dispersion of the long carbon fiber reinforcing agent may deteriorate and when the average cross-sectional diameter is larger than 15 μm, a mechanical property and impact resistance may deteriorate.

According to a preferred embodiment of the present invention, the long carbon fiber reinforcing agent may further include a sizing material. The sizing material may be included in a range of from about 0.1 wt % to about 3 wt % (e.g., about 0.1 wt %, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, or about 3 wt %) with respect to the weight of the long carbon fiber reinforcing agent. Particularly, when the content of the sizing material is smaller than 0.1 wt % with respect to the weight of the long carbon fiber reinforcing agent, the dispersion of the long carbon fiber deteriorates and the mechanical strength may deteriorate. When the content thereof is larger than 3 wt %, the sizing material may deteriorate the mechanical strength of the resin itself. The sizing material may use at least one selected from a group consisting of a urethane resin, an acrylic resin, a styrene resin and an epoxy resin.

According to a preferred embodiment of the present invention, the long carbon fiber reinforcing agent may be included in a range of from about 5 wt % to 40 wt % (e.g., about 5 wt %, 10, 15, 20, 25, 30, 35 or about 40 wt %) with respect to the entire weight of the resin composition of the present invention. Particularly, when the content of the long carbon fiber reinforcing agent is smaller than 5 wt %, the mechanical strength and the impact resistance may deteriorate, and when the content thereof is larger than 40 wt %, light weight is difficult and flowability may deteriorate. More preferably, the long carbon fiber reinforcing agent may be included in a range of from 10 wt % to 30 wt % (e.g., about 10 wt %, 11, 12, 13, 14, 15, 16, 17, 18, 19, 20, 21, 22, 23, 24, 25, 26, 27, 28, 29 or about 30 wt %) with respect to the entire weight of the resin composition.

Thermoplastic Elastomer

According to a preferred embodiment of the present invention, the thermoplastic elastomer may be included for applying processability, rebound resilience, heat resistance and impact resistance to the resin composition of the present invention. The thermoplastic elastomer may use an ethylene-α-olefin copolymer, a styrene-diene copolymer or a mixture thereof.

According to a preferred embodiment of the present invention, the ethylene-α-olefin copolymer is to copolymerize ethylene monomers and α-olefin monomers and the content of the α-olefin monomers may be from about 12 wt % to about 45 wt % (e.g., about 12 wt %, 13, 14, 15, 16, 18, 20, 22, 24, 26, 28, 30, 32, 34, 36, 38, 40, 42, 43, 44 or 45 wt %). More preferably, the ethylene-α-olefin copolymer may use an ethylene-α-C4+ olefin copolymer in which ethylene and α-olefin having 4 carbon atoms or more are copolymerized. Much more preferably, the ethylene-α-olefin copolymer may use an ethylene-α-C4 to 12 olefin copolymer in which ethylene and α-olefin having 4 to 12 carbon atoms are copolymerized. In particular, the ethylene-α-olefin copolymer may use an ethylene-butene-1 copolymer (EBM) or an ethylene-octene-1 copolymer (EOM).

According to a preferred embodiment of the present invention, the styrene-diene copolymer may be prepared by copolymerizing styrene-based monomers and diene-based monomers. The styrene-based monomer may use at least one of a group consisting of styrene, α-methyl styrene, α-ethyl styrene and p-methyl styrene and the diene-based monomer may use butadiene, isoprene or a mixture thereof. In particular, the styrene-diene copolymer may use one or more copolymers selected from a group consisting of a styrene-butylene-styrene block copolymer, a styrene-ethylene-butylene-styrene block copolymer, a styrene-isoprene-styrene block copolymer, a styrene-ethylene-propylene block copolymer and a styrene-ethylene-propylene-styrene block copolymer.

According to a preferred embodiment of the present invention, the thermoplastic elastomer may have a melt index MI of 10 to 40 g/10 min (e.g., about 10 g/10 min, 11, 12, 13, 14, 15, 16, 17, 18, 19, 20, 21, 22, 23, 24, 25, 26, 27, 28, 29, 30, 31, 32, 33, 34, 35, 36, 37, 38, 39 or about 40 g/10 min) measured in a load of 2.16 kg at 230° C. Particularly, when the melt index is smaller than 10 g/10 min, flowability deteriorates and dispersion may deteriorate and when the melt index is larger than 40 g/10 min, impact resistance and surface impact may deteriorate. When the thermoplastic elastomer satisfies the melt index condition, the foam injection moldability is excellent.

According to a preferred embodiment of the present invention, the thermoplastic elastomer may be included in a range of from about 1 wt % to about 10 wt % (e.g., about 1 wt %, 2, 3, 4, 5, 6, 7, 8, 9, or about 10 wt %) with respect to the entire weight of the resin composition of the present invention. Particularly, when the content of the thermoplastic elastomer is smaller than 1 wt %, the impact resistance may deteriorate, and when the content thereof is larger than 10 wt %, the flowability deteriorates and dispersion may deteriorate. Preferably, the thermoplastic elastomer may be included in a range of about 3 wt % to about 5 wt % (e.g., about 3 wt %, 3.4, 4, 4.5, or about 5 wt %) with respect to the entire weight of the resin composition.

Silane-Based Coupling Agent

According to a preferred embodiment of the present invention, the silane-based coupling agent may be included for applying mechanical strength and impact resistance by improving compatibility of the polyamide-6 polymer and the long carbon fiber reinforcing agent.

The silane-based coupling agent may use a silane compound represented by Chemical Formula 1 below.

[Chemical Formula 1]

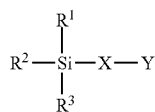

(In Chemical Formula 1, $R^1$, $R^2$, and $R^3$ are hydrogen atom, a hydroxyl group, a $C_1$-$C_{10}$ alkyl group, or a $C_1$-$C_{10}$ alkoxy group, respectively; X is a single bonding line or a $C_1$-$C_{10}$ alkylene group; and Y is a mercapto group, an amino group, a vinyl group, a methacrylgroup, a methacryloxy group, an epoxy group or a glycidoxy group.

In the silane-based coupling agent represented by Chemical Formula 1, preferably, a silane compound in which $R^1$, $R^2$, and $R^3$ are a $C_1$-$C_{10}$ alkyl group or a $C_1$-$C_{10}$ alkoxy group, respectively; X is a $C_1$-$C_{10}$ alkylene group; and Y is a methacryloxy group, a 3,4-epoxycyclohexyl group or a glycidoxy group may be used.

The silane-based coupling agent may particularly use at least one selected from a group consisting of 3-glycidoxypropyl trimethoxy silane, 3-glycidoxypropyl methyl dimethoxy silane, 2-(3,4-epoxycyclohexyl)ethyl trimethoxy silane, and 3-methacryloxy propyl trimethoxy silane, but is not particularly limited thereto.

According to a preferred embodiment of the present invention, the silane-based coupling agent may preferably apply a silane-based coupling agent in which an epoxy group or a glycidoxy group is bonded to a terminal.

According to a preferred embodiment of the present invention, the silane-based coupling agent may be included in a range of from about 1 wt % to about 5 wt % (e.g., about 1 wt %, 2, 3, 4 or about 5 wt %) with respect to the entire weight of the resin composition of the present invention. Particularly, when the content of the silane-based coupling agent is smaller than 1 wt %, mechanical strength and impact resistance may deteriorate, and when the content thereof is larger than 5 wt %, the mechanical strength may deteriorate by a low-molecular weight coupling agent itself and processability may deteriorate according to deterioration of flowability by increasing melt viscosity of the resin. Preferably, the silane-based coupling agent may be included in a range of about 1 wt % to about 3 wt % (e.g., about 1 wt %, 1.5, 2, 2.5, or about 3 wt %) with respect to the entire weight of the resin composition.

Sodium Phosphate Nucleating Agent

According to a preferred embodiment of the present invention, the sodium phosphate nucleating agent may be included for resolving stiffness, heat resistance, and gas stains on the injection surface caused by foaming in an injection process.

The sodium phosphate nucleating agent may use a sodium phosphate salt represented by Chemical Formula 2 below.

[Chemical Formula 2]

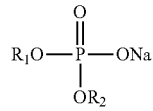

In Chemical Formula 2, $R_1$ and $R_2$ are hydrogen atom, a $C_1$-$C_{10}$ alkyl group, or

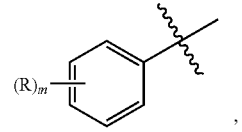

respectively, or $R_1$ and $R_2$ are connected to each other to form

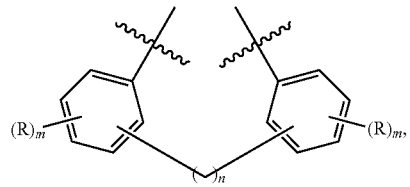

R is a $C_1$-$C_{10}$ alkyl group as a substitute group of a benzene ring, m is an integer of 0 to 3 as the substitute number of R, and n is an integer of 0 to 3 as the number of —$CH_2$—.

Preferably, the sodium phosphate nucleating agent may use a sodium phosphate salt represented by Chemical Formula 2a below.

[Chemical Formula 2a]

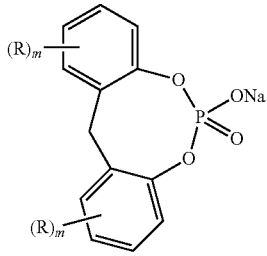

In Chemical Formula 2a, R is selected from a methyl group, an ethyl group, an n-propyl group, an isopropyl group, an n-butyl group, and a tert-butyl group as a substitution group of the benzene ring, and m is an integer of 0 to 3 as the substitute number of R.

The sodium phosphate nucleating agent may particularly use a 2,2'-methylene-bis-(4,6-di-tert-butylphenyl) sodium phosphate salt, a 2,2'-methylene-bis-(4-tert-butylphenyl) sodium phosphate salt, or a mixture thereof, but is not particularly limited thereto.

According to a preferred embodiment of the present invention, the sodium phosphate nucleating agent may be included in a range of from about 0.1 wt % to about 2 wt % (e.g., about 0.1 wt %, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or about 2 wt %) with respect to the entire weight of the resin composition of the present invention. Particularly, when the content of the sodium phosphate nucleating agent is smaller than 0.1 wt %, nucleation of the polyamide-6 resin is not sufficiently performed and thus tensile strength and flexural strength may deteriorate. Particularly, when the nucleation is not sufficiently performed on the surface of the mold during foam injection, the surface is not consolidated and then foam gas is transferred to the surface, and thus an injection appearance may deteriorate. On the other hand, when the content of the sodium phosphate nucleating agent is larger than 2 wt %, impact strength may deteriorate. Preferably, the sodium phosphate nucleating agent may be included in a range of from about 0.5 wt % to about 2 wt % (e.g., about 0.5 wt %, 0.6, 0.7, 0.8, 0.9, 1, 1.1, 1.2, 1.3, 1.4, 1.5, 1.6, 1.7, 1.8, 1.9, or about 2 wt %) with respect to the entire weight of the resin composition.

According to a preferred embodiment of the present invention, general additives may be further included in the long carbon fiber reinforced thermoplastic resin composition for foam injection. The additives may include an antioxidant and an antistatic agent and be contained in an appropriate content range. Herein, the antioxidant may use at least one selected from a group consisting of a phenolic antioxidant, a phosphite antioxidant, and a thiodipropionate synergist and the antioxidants or other additives may be easily used by those skilled in the art.

Meanwhile, a method of preparing the long carbon fiber reinforced thermoplastic resin composition for foam injection of the present invention may include a mixing method using general melt mixers such as a Banbury mixer, a uniaxial extruder, a biaxial extruder, a multi-wheel screw extruder, and a pull-out molder. The long carbon fiber reinforced thermoplastic resin composition may be molded by a general foam injection molding method after mixing. As the foam injection molding method, the long carbon fiber reinforced thermoplastic resin composition may be molded by an ultrafine foam molding method which is a technique in which gas in a supercritical state is injected into a cylinder and then mixed with the resin composition and the mixture is injected into the mold to form microbubbles of about 40 μm to about 80 μm in an injected article. Further, as the foam injection molding method, the long carbon fiber reinforced thermoplastic resin composition may be molded by an injection molding method including a chemical foam agent. The present invention is not particularly limited to the foam injection molding method and conditions thereof.

Meanwhile, the present invention provides a molded article manufactured by molding the long carbon fiber reinforced thermoplastic resin composition through foam injection.

According to a preferred embodiment of the present invention, the molded article may be a vehicle panoramic sunroof frame.

The long carbon fiber reinforced thermoplastic resin composition according to the present invention minimizes deformation after injection molding because light weight and economic feasibility are excellent due to implementation of low weight and simultaneously light weight components. High stiffness, durability and dimensional stability of the composition are excellent as compared with polybutylene terephthalate/glass fiber materials in the related art, thereby improving assembly and stability of components. The composition can be used for producing a product having an excellent injection appearance during foam injection molding. As a result, the long carbon fiber reinforced thermoplastic resin composition may be utilized as an exterior component material for a vehicle structure such as a panoramic sunroof frame.

Hereinafter, the present invention will be described in more detail based on Examples and the present invention is not limited by the following Examples.

EXAMPLES

Examples 1 and 2 and Comparative Examples 1 to 8. Preparation of Thermoplastic Resin Composition Composition components illustrated in Table 1 below were weighed and mixed with each other to prepare a pellet by using a biaxial extruder and a pull-out molder. In addition, a specimen for measuring properties was prepared by foam injection molding so that a foam rate is 15% by using a MuCell™ method by Trexell Corporation.

[Composition Components]

Polyamide-6 Polymer

Polyamide-6 having number average molecular weight of 50,000

Reinforcing Agent

Long carbon fiber in which a raw material is polyacrylonitrile (PAN), an average cross-sectional diameter is 7 μm, a length is 10 mm, and an epoxy resin is contained with a content of 1 wt % with respect to the weight of the long carbon fiber reinforcing agent as a sizing material.

Short carbon fiber in which a raw material is polyacrylonitrile (PAN), an average cross-sectional diameter is 7 μm, a length is 2 mm, and an epoxy resin is contained with a content of 1 wt % with respect to the weight of the long carbon fiber reinforcing agent as a sizing material.

Thermoplastic Elastomer

A melt index measured under a condition of 230° C. and a load of 2.16 kg is 15 g/10 min and ethylene-butene-1 copolymer (EBM) is included.

Coupling Agent (D1) Silane-based coupling agent: 3-glycidoxypropyltrimethoxysilane Modified polypropylene-based coupling agent: Modified polypropylene in which maleic anhydride is grafted with a content of 8 wt % with respect to the weight of polypropylene (E) Nucleating Agent (E1) Sodium phosphate nucleating agent: 2,2'-methylene-bis-(4,6-di-tert-butylphenyl) sodium phosphate salt (E2) Sorbitol-based nucleating agent: Dibenzylidene sorbitol

TABLE 1

| Classification | | Example | | Comparative Example | | | | | | | |
|---|---|---|---|---|---|---|---|---|---|---|---|
| | | 1 | 2 | 1 | 2 | 3 | 4 | 5 | 6 | 7 | 8 |
| (A) Polyamide-6 | | 73 | 68 | 73 | 69 | 65 | 68 | 68 | 70.5 | 61 | 70.5 |
| (B) Reinforcing agent | (B1) | 20 | 25 | 0 | 25 | 25 | 25 | 25 | 25 | 25 | 25 |
| | (B2) | 0 | 0 | 20 | 0 | 0 | 0 | 0 | 0 | 0 | 0 |
| (C) Thermoplastic elastomer | | 3 | 3 | 3 | 3 | 3 | 3 | 3 | 3 | 3 | 0.5 |
| (D) Coupling agent | (D1) | 3 | 3 | 3 | 3 | 3 | 3 | 0 | 0.5 | 10 | 3 |
| | (D2) | 0 | 0 | 0 | 0 | 0 | 0 | 3 | 0 | 0 | 0 |

TABLE 1-continued

| Classification | | Example | | Comparative Example | | | | | | | |
|---|---|---|---|---|---|---|---|---|---|---|---|
| | | 1 | 2 | 1 | 2 | 3 | 4 | 5 | 6 | 7 | 8 |
| (E) Nucleating agent | (E1) | 1 | 1 | 1 | 0 | 4 | 0 | 1 | 1 | 1 | 1 |
| | (E2) | 0 | 0 | 0 | 0 | 0 | 1 | 0 | 0 | 0 | 0 |
| Total content (wt %) | | 100 | 100 | 100 | 100 | 100 | 100 | 100 | 100 | 100 | 100 |

TEST EXAMPLES

In the specimens prepared in Examples 1 and 2 and Comparative Examples 1 to 8, properties were measured by the following methods and then the results were illustrated in Table 2 below.

[Measurement Method of Properties]

Specific Gravity: Measured by ASTM D792

Tensile strength: Measured by ASTM D638.

Flexural strength: Measured by ASTM D790.

Flexural modulus: Measured by ASTM D790.

IZOD impact strength: Measured by ASTM D256 under a ¼" notched condition and a temperature condition of room temperature (23° C.).

Heat deformation temperature: Heat deformation temperature measured by applying surface pressure of 1.82 MPa according to ASTM D648.

Injection surface appearance: Presence or absence of gas stains on the surface of the specimen measured by the naked eye.

x: Occurrence of gas stains o: No gas stains

TABLE 2

| Classification | Example | | Comparative Example | | | | | | | |
|---|---|---|---|---|---|---|---|---|---|---|
| | 1 | 2 | 1 | 2 | 3 | 4 | 5 | 6 | 7 | 8 |
| Specific Gravity (g/cm$^3$) | 1.03 | 1.06 | 1.03 | 1.06 | 1.06 | 1.06 | 1.06 | 1.06 | 1.06 | 1.06 |
| Tensile strength (MPa) | 160 | 190 | 145 | 185 | 182 | 185 | 155 | 157 | 165 | 191 |
| Flexural strength (MPa) | 270 | 300 | 250 | 290 | 287 | 292 | 250 | 255 | 255 | 301 |
| Flexural modulus (GPa) | 11.5 | 14 | 10 | 12 | 13.5 | 13 | 10.5 | 11 | 12.5 | 14.2 |
| IZOD impact strength (J/m) | 75 | 90 | 30 | 85 | 45 | 80 | 40 | 45 | 78 | 25 |
| Heat deformation temperature (° C.) | 210 | 210 | 210 | 210 | 210 | 210 | 210 | 210 | 205 | 210 |
| Injection surface appearance | o | o | o | x | o | x | o | o | o | o |

According to the result in Table 2, in the specimens of Examples 1 and 2, the long carbon fiber reinforcing agent, the silane-based coupling agent, the thermoplastic elastomer, the sodium phosphate nucleating agent were included in the polyamide-6 polymer with appropriate contents. Thus, it was confirmed that the properties such as tensile strength, flexural strength, flexural modulus, impact strength, and a heat deformation temperature were evenly improved and the injection surface appearance was also good.

On the other hand, in Comparative Examples 1 to 8, the thermoplastic resin composition was configured by specimens without the long carbon fiber reinforcing agent (Comparative Example 1), without the sodium phosphate nucleating agent (Comparative Examples 2 and 4), more than the content of sodium phosphate nucleating agent (Comparative Example 3), without the silane-based coupling agent (Comparative Example 5), less than or more than the content of the silane-based coupling agent (Comparative Examples 6 and 7), and less than the content of the thermoplastic elastomer (Comparative Example 7). As compared with Examples 1 and 2, in the specimens of Comparative Examples 1 to 8, the properties such as tensile strength, flexural strength, flexural modulus, impact strength, and a heat deformation temperature deteriorated or defects due to gas stains on the injection surface during foam injection were confirmed.

Accordingly, it can be seen that the long carbon fiber reinforced thermoplastic resin composition for foam injection according to the present invention minimizes deformation after injection molding because light weight and economic feasibility are excellent due to implementation of low density and simultaneously light weight, high stiffness, durability and dimensional stability are excellent, thereby improving assembly and stability of components and producing a product having an excellent injection appearance during foam injection molding.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A long carbon fiber reinforced thermoplastic resin composition for foam injection, comprising:
   (A) about 45 wt % to 90 wt % of a polyamide-6 polymer;
   (B) about 5 wt % to 40 wt % of a long carbon fiber reinforcing agent with an average cross-sectional diameter of from about 5 to 15 μm and a length of from about 5 to 15 mm;
   (C) about 1 wt % to 10 wt % of a thermoplastic elastomer with a melt index of from about 10 to 40 g/10 min (@230° C., 2.16 kg);
   (D) about 1 wt % to 5 wt % of a silane-based coupling agent;
   (E) 0.2 wt % to 2 wt % of a sodium phosphate nucleating agent, and
   wherein the sodium phosphate nucleating agent resolves stiffness, heat resistance, and gas stains on the injection surface caused by foaming injection.

2. The long carbon fiber reinforced thermoplastic resin composition of claim 1, wherein the (A) polyamide-6 polymer has a number average molecular weight of about 20,000 to 70,000.

3. The long carbon fiber reinforced thermoplastic resin composition of claim 1, wherein the (B) long carbon fiber reinforcing agent is polyacrylonitrile (PAN), pitch or a mixture thereof.

4. The long carbon fiber reinforced thermoplastic resin composition of claim 1, wherein the (B) long carbon fiber reinforcing agent comprises a sizing material of from about 0.1 wt % to about 3 wt % with respect to the weight of the long carbon fiber reinforcing agent.

5. The long carbon fiber reinforced thermoplastic resin composition of claim 4, wherein the sizing material is at least one selected from a group consisting of a urethane resin, an acrylic resin, a styrene resin and an epoxy resin.

6. The long carbon fiber reinforced thermoplastic resin composition of claim 1, wherein the (C) thermoplastic elastomer is an ethylene-α-C4 to 12 olefin copolymer, a styrene-diene copolymer, or a mixture thereof.

7. The long carbon fiber reinforced thermoplastic resin composition of claim 1, wherein the (D) silane-based coupling agent is a silane compound represented by Chemical Formula 1 below:

[Chemical Formula 1]

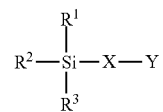

Wherein in Chemical Formula 1, $R^1$, $R^2$, and $R^3$ are hydrogen atom, a hydroxyl group, and C1-C10 alkyl group or C1-C10 alkoxy group, respectively; X is a single bonding line or a C1-C10 alkylene group; and Y is a mercapto group, an amino group, a vinyl group, a methacryl group, a methacryloxy group, an epoxy group, a 3,4-epoxy cyclohexyl group or a glycidoxy group.

8. The long carbon fiber reinforced thermoplastic resin composition of claim 7, wherein the (D) silane-based coupling agent is a silane compound in which $R^1$, $R^2$, and $R^3$ are a $C_1$-$C_{10}$ alkyl group or a $C_1$-$C_{10}$ alkoxy group, respectively; X is a $C_1$-$C_{10}$ alkylene group; and Y is a methacryloxy group, a 3,4-epoxycyclohexyl group or a glycidoxy group in Chemical Formula 1.

9. The long carbon fiber reinforced thermoplastic resin composition of claim 1, wherein the (E) the sodium phosphate nucleating agent is a sodium phosphate salt represented by Chemical Formula 2 below:

[Chemical Formula 2]

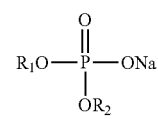

Wherein in Chemical Formula 2, $R_1$ and $R_2$ are a hydrogen atom, a C1-C10 alkyl group, or

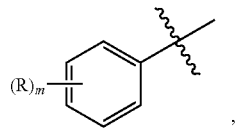

, respectively, or $R_1$ and $R_2$ are connected to each other to form

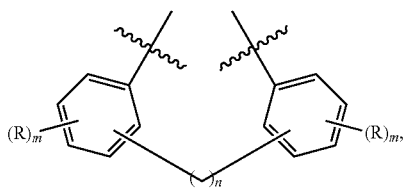

R is a $C_1$-$C_{10}$ alkyl group as a substitute group of a benzene ring, m is an integer of 0 to 3 as the substitute number of R, and n is an integer of 0 to 3 as the number of —CH2-.

10. The long carbon fiber reinforced thermoplastic resin composition of claim 9, wherein the (E) sodium phosphate nucleating agent is a sodium phosphate salt represented by Chemical Formula 2a:

[Chemical Formula 2a]

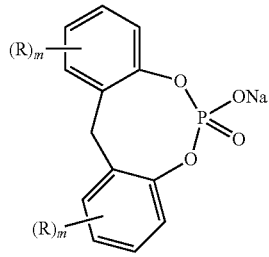

wherein R is selected from a methyl group, an ethyl group, an n-propyl group, an isopropyl group, an n-butyl group, and a tert-butyl group as a substitution group of the benzene ring, and m is an integer of 0 to 3 as the substitute number of R.

11. A molded article prepared by comprising the long carbon fiber reinforced thermoplastic resin composition for foam injection of claim 1.

12. The molded article of claim 11, wherein the molded article is a vehicle panoramic sunroof frame.

* * * * *